(12) United States Patent
Arai et al.

(10) Patent No.: US 12,159,655 B2
(45) Date of Patent: Dec. 3, 2024

(54) BASE PLATE OF DISK DRIVE SUSPENSION, DISK DRIVE SUSPENSION, AND DISK DRIVE

(71) Applicant: NHK SPRING CO., LTD., Yokohama (JP)

(72) Inventors: Mikio Arai, Yokohama (JP); Hiroshi Daifuku, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/093,769

(22) Filed: Jan. 5, 2023

(65) Prior Publication Data
US 2023/0223044 A1 Jul. 13, 2023

(30) Foreign Application Priority Data
Jan. 11, 2022 (JP) ................. 2022-002463

(51) Int. Cl.
*G11B 5/48* (2006.01)
(52) U.S. Cl.
CPC .......... *G11B 5/4846* (2013.01); *G11B 5/4833* (2013.01)
(58) Field of Classification Search
None
See application file for complete search history.

(56) References Cited

U.S. PATENT DOCUMENTS

| | | | | |
|---|---|---|---|---|
| 4,991,045 A * | 2/1991 | Oberg | ............ | G11B 5/58 |
| 5,153,794 A | 10/1992 | Hinlein | | |
| 5,172,286 A | 12/1992 | Jurgenson | | |
| 5,185,683 A * | 2/1993 | Oberg | ............ | G11B 5/58 |
| 5,187,626 A * | 2/1993 | Hopkins | ............ | G11B 5/4813 |
| 5,461,524 A * | 10/1995 | Jurgenson | ............ | G11B 5/5521 |
| 5,491,599 A * | 2/1996 | Sogabe | ............ | G11B 5/4826 360/265.7 |
| 5,689,389 A * | 11/1997 | Braunheim | ............ | G11B 21/16 |
| 6,038,103 A * | 3/2000 | Boutaghou | ............ | G11B 5/4813 |
| 6,198,602 B1 * | 3/2001 | Vera | ............ | G11B 5/4813 |
| 6,353,994 B1 * | 3/2002 | Boutaghou | ............ | G11B 5/4813 29/603.03 |
| 6,368,685 B1 * | 4/2002 | Schmidt | ............ | G11B 5/49 29/523 |
| 6,372,315 B1 * | 4/2002 | Schmidt | ............ | G11B 5/4813 29/523 |
| 6,657,821 B1 * | 12/2003 | Jenneke | ............ | G11B 5/4813 |

(Continued)

FOREIGN PATENT DOCUMENTS

| | | |
|---|---|---|
| JP | H0249279 A | 2/1990 |
| JP | 2736174 B2 | 4/1998 |

*Primary Examiner* — William J Klimowicz
(74) *Attorney, Agent, or Firm* — Holtz, Holtz & Volek PC

(57) ABSTRACT

A base plate includes a plate body and a connection portion provided at the plate body. The connection portion includes a through hole gassing through the plate body in a thickness direction of the plate body, a plurality of protrusions provided along an edge of the through hole in a circumferential direction about a central axis of the through hole and inserted into an attachment hole provided in the arm, and an inner circumferential surface formed by the plurality of protrusions and the through hole. The inner circumferential surface includes a plurality of recesses formed between the plurality of protrusions.

11 Claims, 12 Drawing Sheets

FIG.6

(56) References Cited

U.S. PATENT DOCUMENTS

| | | | |
|---|---|---|---|
| 8,233,239 B1* | 7/2012 | Teo | G11B 5/4813 360/244.6 |
| 2005/0078407 A1* | 4/2005 | Diewanit | G11B 5/4833 360/99.16 |
| 2021/0264941 A1 | 8/2021 | Teo et al. | |

* cited by examiner

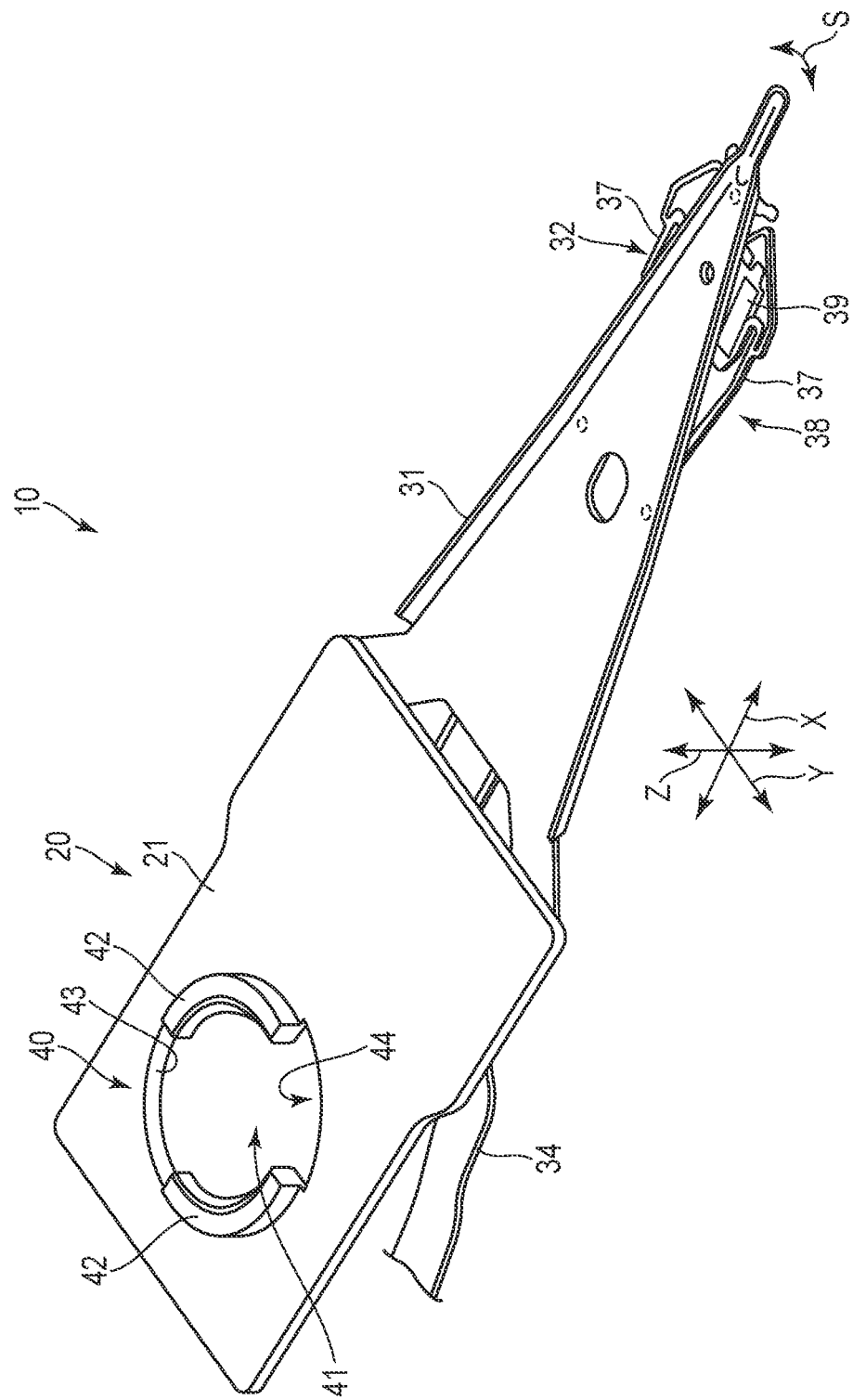
F I G. 3

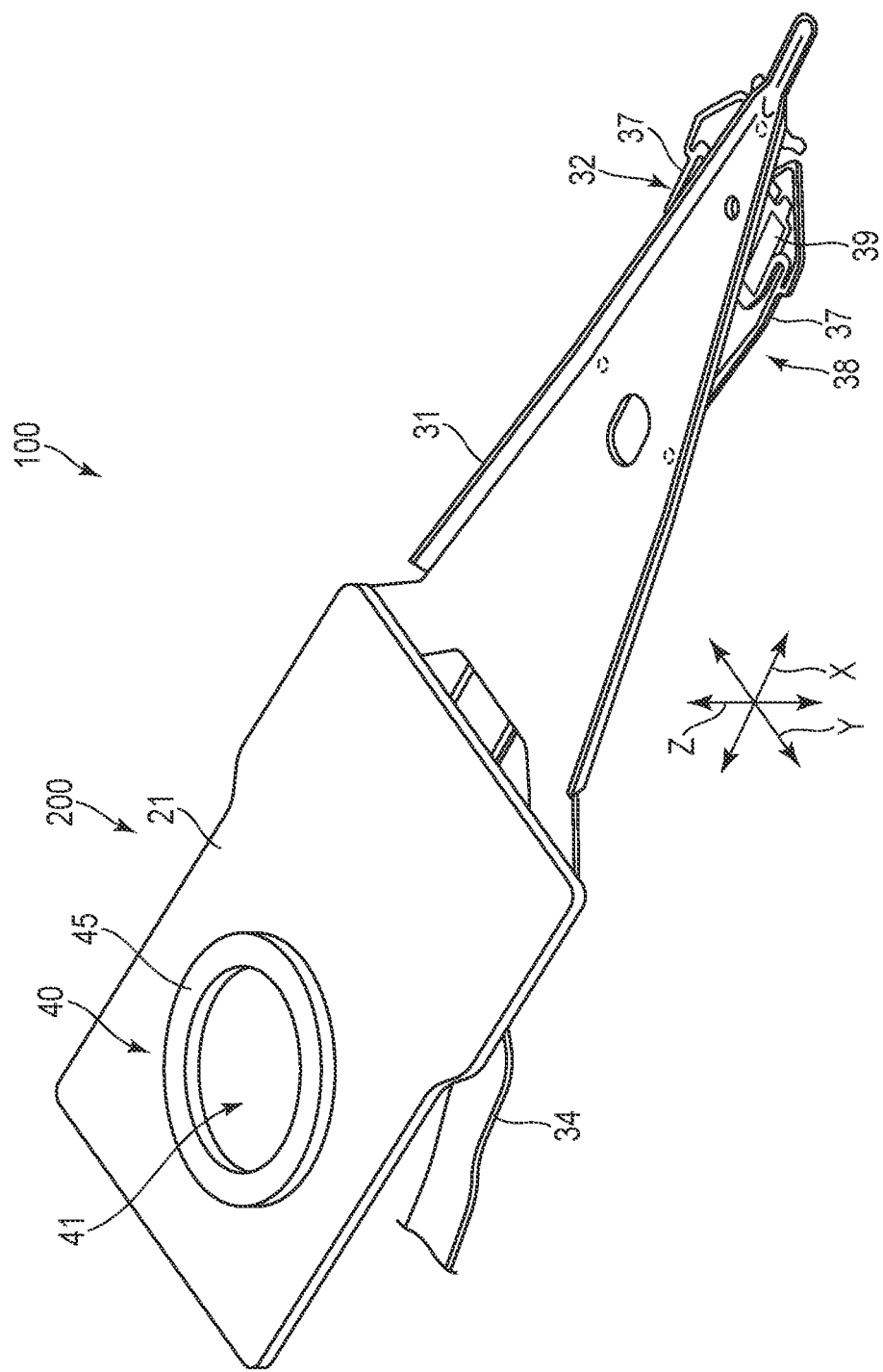
F I G. 11

BASE PLATE OF DISK DRIVE SUSPENSION, DISK DRIVE SUSPENSION, AND DISK DRIVE

CROSS-REFERENCE TO RELATED APPLICATIONS

This application is based upon and claims the benefit of priority from prior Japanese Patent Application No. 2022-002463, filed Jan. 11, 2022, the entire contents of which are incorporated herein by reference.

BACKGROUND OF THE INVENTION

1. Field of the Invention

The present invention relates to a base plate of disk drive suspension, a disk drive suspension, and a disk drive.

2. Description of the Related Art

A hard disk drive (HDD) is used in an information processing apparatus such as a personal computer. The hard disk drive includes a magnetic disk which is rotatable about a spindle, a carriage which swivels about a pivot, and the like. The carriage is equipped with an arm and is made to swivel about the pivot in a track width direction of the disk by a positioning motor such as a voice coil motor.

A disk drive suspension (hereinafter simply referred to as a suspension) is attached to the arm mentioned above. The suspension includes a base plate connected to the arm, a load beam, a flexure arranged along the load beam, and the like. A slider, which constitutes a magnetic head, is mounted on a gimbal portion formed near a distal end of the flexure.

The slider is equipped with an element (transducer) for accessing data, i.e., reading or writing data. A head gimbal assembly is constituted by the load beam, the flexure, the slider, and the like.

Various proposals have been made for the connection between the base plate and the arm (for example, JP 2736174 B, US 2021-0264941 A1, JP H02-049279 A, U.S. Pat. Nos. 5,187,626 A, and 5,153,794 A).

In order to accommodate to the increase in the recording density of the disks, the head gimbal assembly needs to be further downsized, and the slider needs to be positioned more precisely relative to the recording surface of the disks.

Due to the strong demand for increased recording capacity of the hard disk drive for increased recording density, an increase in the number of magnetic disks provided in the hard disk drive (so-called multi-disking) has been promoted. In order to increase the number of magnetic disks, it is necessary not only to make magnetic disks and the like thinner, but also to make the distance between magnetic disks shorter.

To reduce the distance between magnetic disks, a height of a boss portion that the base plate has may be lowered and the thickness of the arm may be thereby reduced, as an example. However, if the height of the boss portion is lowered, it becomes difficult to maintain the connection between the base plate and the arm. There is still room for various improvements regarding the connection between the base plate and the arm.

BRIEF SUMMARY OF THE INVENTION

The present invention aims to provide a base plate of disk drive suspension, a disk drive suspension, and a disk drive capable of making the arm thinner.

According to one embodiment, a base plate of a disk dive suspension is connected to an arm provided in a disk drive. The base plate comprises a plate body, and a connection portion provided at the plate body. The connection portion includes a through hole passing through the plate body in a thickness direction of the plate body, a plurality of protrusions provided along an edge of the through hole in a circumferential direction about a central axis of the through hole and inserted into an attachment hole provided in the arm, and an inner circumferential surface formed by the plurality of protrusions and the through hole. The inner circumferential surface includes a plurality of recesses formed between the plurality of protrusions.

The plurality of protrusions have a first length in the circumferential direction, and the plurality of recesses may have a second length greater than the first length in the circumferential direction. Each of the plurality of protrusions may include a proximal portion connected to the plate body an extending portion including an end located on a side opposite to the proximal portion in the thickness direction, and a pressing portion located between the proximal portion and the end with a width in a radial direction intersecting the thickness direction greater than the proximal portion.

According to another embodiment, a disk drive suspension comprises the base plate of the disk drive suspension, a load beam connected to the base plate, and a flexure arranged along the load beam.

The base plate comprises a plate body and a connection portion provided at the plate body, and the connection portion includes a through hole passing through the plate body in a thickness direction of the plate body, and a plurality of protrusions provided along an edge of the through hole in a circumferential direction about a central axis of the through hole and inserted into an attachment hole provided in the arm, and the plurality of protrusions may not overlap with a line intersecting the central axis and parallel to an extension direction of the load beam.

According to yet another embodiment, a disk drive comprises an arm having a first attachment surface, a second attachment surface on a side opposite to the first attachment surface, and an attachment hole passing through the first attachment surface and the second attachment surface, a first disk drive suspension serving as the disk drive suspension, which is connected to the arm from a side of the first attachment surface, and a second disk drive suspension serving as the disk drive suspension, which is connected to the arm from a side of the second attachment surface.

A plurality of protrusions of a first base plate provided in the first disk drive suspension and a plurality of protrusions of a second base plate provided in the second disk drive suspension are inserted into the attachment hole, the plurality of protrusions of the first base plate is overlapping with a plurality of recesses formed between the plurality of protrusions of the second base plate. A height of the plurality of protrusions may be greater than a thickness of the arm.

According to the base plate of disk drive suspension, the disk drive suspension, and the disk drive having the configuration, the arm can be made thinner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic perspective view showing a suspension according to a first embodiment.

FIG. 11 is a view showing a comparative example of the base plate according to the first embodiment.

DETAILED DESCRIPTION OF THE INVENTION

First Embodiment

Figure 1:
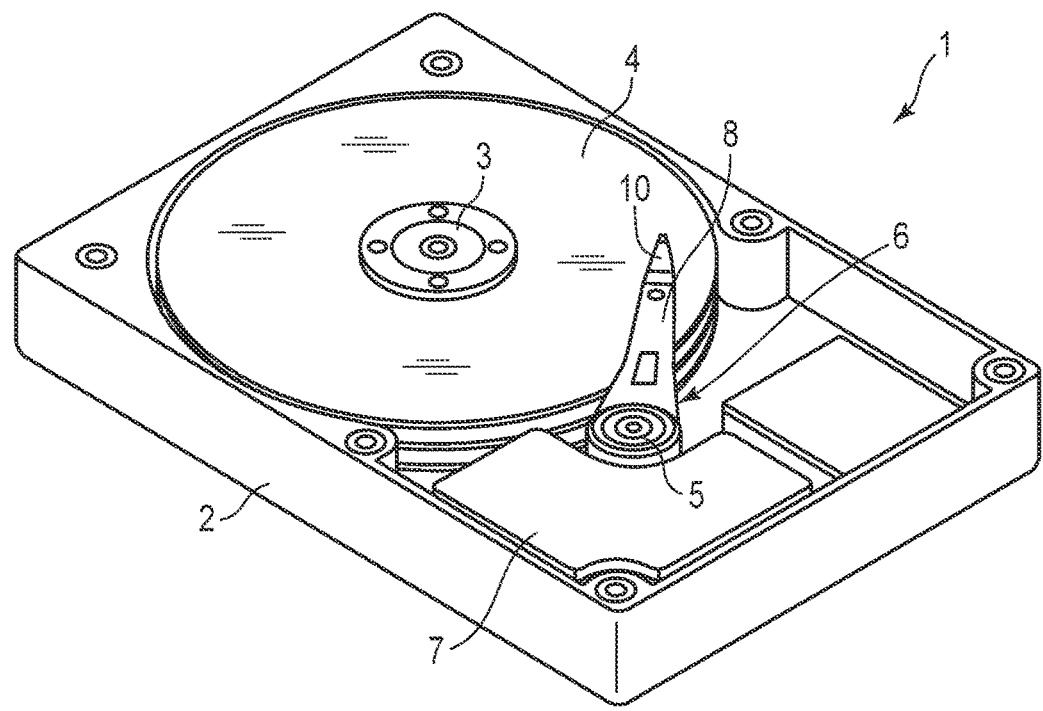
FIG. 1 is a schematic perspective view showing an example of a disk drive.

FIG. 1 is a schematic perspective view showing an example of a disk drive (HDD) 1. In the example shown in FIG. 1, the disk drive 1 comprises a casing 2, a plurality of magnetic disks (hereafter referred to simply as disks 4) rotating about a spindle 3, a carriage 6 that can swivel about a pivot 5, and a positioning motor (voice coil motor) 7 for driving the carriage 6. The casing 2 is sealed by a lid (not shown).

Figure 2:
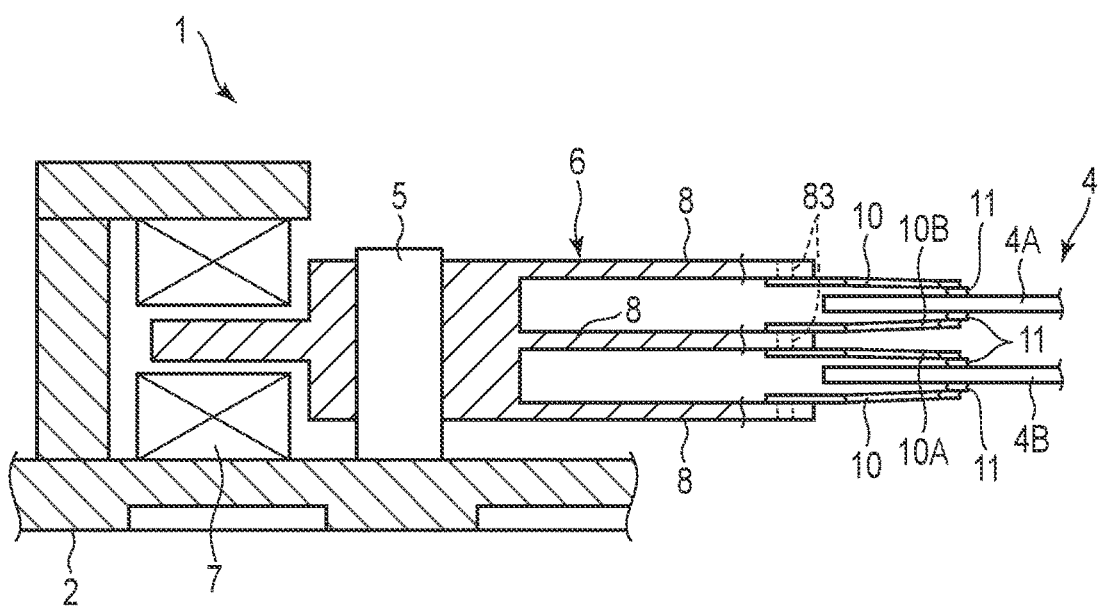
FIG. 2 is a schematic cross-sectional view showing a part of the disk drive.

FIG. 2 is a schematic cross-sectional view showing a part of the disk drive 1. As shown in FIG. 1 and FIG. 2, a plurality of (for example, three) arms 8 are provided at the carriage 6. The arms 8 may be referred to as carriage arms, HSA arms, or the like. The arms 8 are formed of, for example, a metallic material such as aluminum alloy. The quantity of arms 8 provided at the carriage 6 is not limited to the above example.

A suspension 10 is attached to each of distal end portions of the plurality of arms 8. A slider 11, which constitutes a magnetic head, is provided at each of distal end portions of the suspensions 10.

When the disks 4 are rotated at a high speed, air flows in between the disks 4 and the sliders 11 and an air bearing is thereby formed. When the carriage 6 is swiveled by the positioning motor 7, the suspension 10 moves radially relative to the disks 4, and the sliders 11 thereby move to desired tracks of the disks 4.

As shown in FIG. 2, the disks 4 include a first disk 4A and a second disk 4B. The first disk 4A is opposed to the second disk 4B at a predetermined interval. The plurality of suspensions 10 provided at the disk drive 1 includes a first suspension 10A and a sec d suspension 10B.

The first suspension 10A and the second suspension 10B are attached to the arm 8 located in the center of the casing 2 in the thickness direction, of the plurality of arms 8. The first suspension 10A and second suspension 10B are common to each other in basic configuration.

The first suspension 10A and the second suspension 10B are located between the first disk 4A and the second disk 4B. In the thickness direction of the casing 2, the first suspension 10A faces the second suspension 10B. The number of disks 4 is not limited to two, but may be three or more. The quantity of suspensions 10 is changed arbitrarily in accordance with the number of disks 4.

Figure 4:
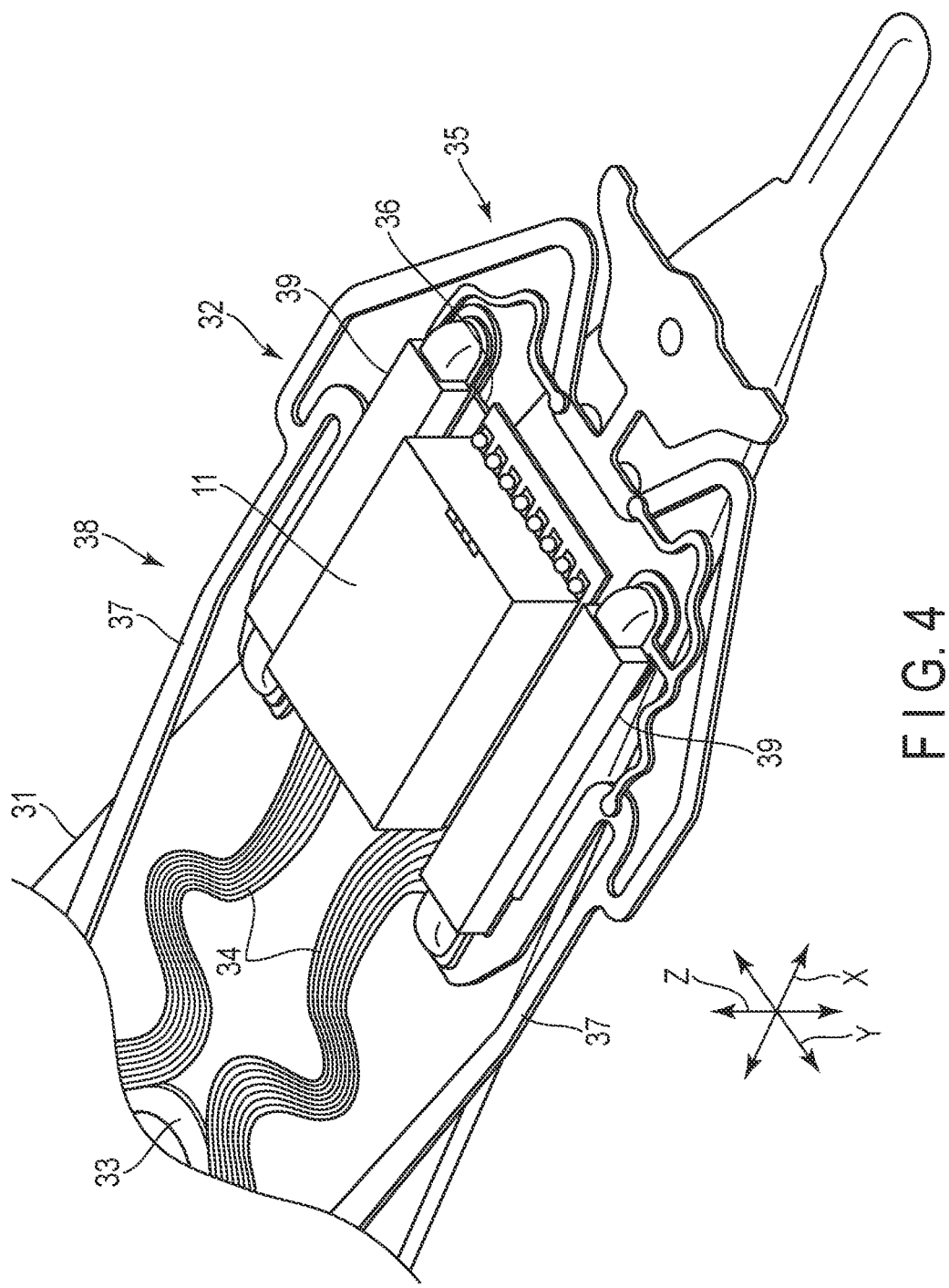
FIG. 4 is a schematic perspective view showing a distal side part of the suspension shown in FIG. 3 as seen from a slider side.

FIG. 3 is a schematic perspective view showing the suspension according to the first embodiment. FIG. 4 is a schematic perspective view showing a distal side part of the suspension 10 shown in FIG. 3 as seen from the slider 11 side. The suspension 10 comprises a base plate 20 connected to the arm 8 (shown in FIG. 2), a load beam 31, and a flexure 32.

All the base plate 20, the load beam 31, and the flexure 32 extend in the longitudinal direction of the suspension 10. The longitudinal direction of the suspension 10, the base plate 20, the load beam 31, and the flexure 32 are defined as a longitudinal direction X in the following descriptions.

A direction orthogonal to the longitudinal direction X is defined as a transverse direction Y of the suspension 10, the base plate 20, the load beam 31, the flexure 32, and the like. Since the suspension 10, the base plate 20, the load beam 31, and the flexure 32 extend in the longitudinal direction X, the longitudinal direction X corresponds to a direction of extension.

A direction intersecting (for example, orthogonal to) the longitudinal direction X and the transverse direction Y defined as a thickness direction Z of the suspension 10, the base plate 20, the load beam 31, the flexure 32, and the like. A thickness direction of the casing 2 corresponds to the thickness direction Z. Furthermore, a sway direction S is defined as indicated by an arc-shaped arrow near the distal end of the load beam 31.

The base plate 20 is formed of, for example, a metallic material such as stainless steel. The thickness of the base plate 20 is, for example, 100 μm or less, for example, 50 μm.

The thickness of the base plate 20 is greater than, for example, the thickness of the load beam 31 and the flexure 32.

The base plate 20 comprises a plate body 21 and a connection portion 40 provided in the plate body 21. The connection portion 40 includes a through hole 41, a plurality of (for example, two) protrusions 42, and an inner circumferential surface 43. In the example shown in FIG. 3, for example, the through hole 41 is formed at a position remote from the distal end (right side in the figure) in the longitudinal direction X.

The load beam 31 is formed of a metallic material such as stainless steel. The thickness of the load beam 31 is, for example, 30 to 80 µm. The load beam 31 has a shape tapered toward the distal end.

For example, the load beam 31 is connected to the base plate 20 by spot welding using a laser. The load beam 31 is elastically supported by the base plate 20. The flexure 32 is arranged along the base plate 20 and the load beam 31. For example, the flexure 32 is fixed to the base plate 20 and the load beam 31 by spot welding using a laser.

The flexure 32 includes a metal base 33 formed of a thin stainless steel plate, and a wiring portion 34 arranged along the metal base 33. The thickness of the metal base 33 is smaller than the thickness of the load beam 31.

The thickness of the metal base 33 is, for example, 12 to 25 µm, and 20 µm as an example. A part of the wiring portion 34 is electrically connected to an element of the slider 11 via a terminal for the slider 11.

As shown in FIG. 4, the flexure 32 further includes a tongue 36 and a pair of outriggers 37 at a distal end portion 35. The slider 11 is mounted on the tongue portion 36. For example, an element such as an MR element, which is capable of conversion between magnetic and electrical signals, is provided at the distal end portion of the slider 11.

The wiring portion 34 is electrically connected to the element of the slider 11 via a terminal, at the distal end portion 35. Accessing the data such as writing or reading the data on the disk 4 is performed by these elements. A head gimbal assembly is constituted by the slider 11, the load beam 31, the flexure 32, and the like.

The pair of outriggers 37 are arranged on both sides of the tongue 36 in the transverse direction Y, respectively. The pair of outriggers 37 are shaped to protrude toward both outer sides of the tongue 36 in the transverse direction Y. The tongue 36 and the pair of outriggers 37 are parts of the metal base 33 and their outlines are formed by, for example, etching.

A gimbal portion 38 is constituted by the tongue 36, the pair of outriggers 37, and the like. The gimbal portion 38 is formed at the distal side portion 35 of the flexure 32. Micro actuator elements 39 are mounted on the gimbal portion 35. The micro actuator elements 39 have a function of pivoting the tongue 36 in the sway direction S.

The micro actuator elements 39 are arranged on both sides of the slider 11 in the transverse direction Y. The micro actuator elements 39 are formed of piezoelectric elements of lead zirconate titanate (PZT) or the like. The micro actuator elements 39 are fixed to actuator support portions of the tongue 36, respectively, by conductive adhesives or the like.

Next, the base plate 20 will be described with reference to FIG. 5 to FIG. 8.

Figure 5:
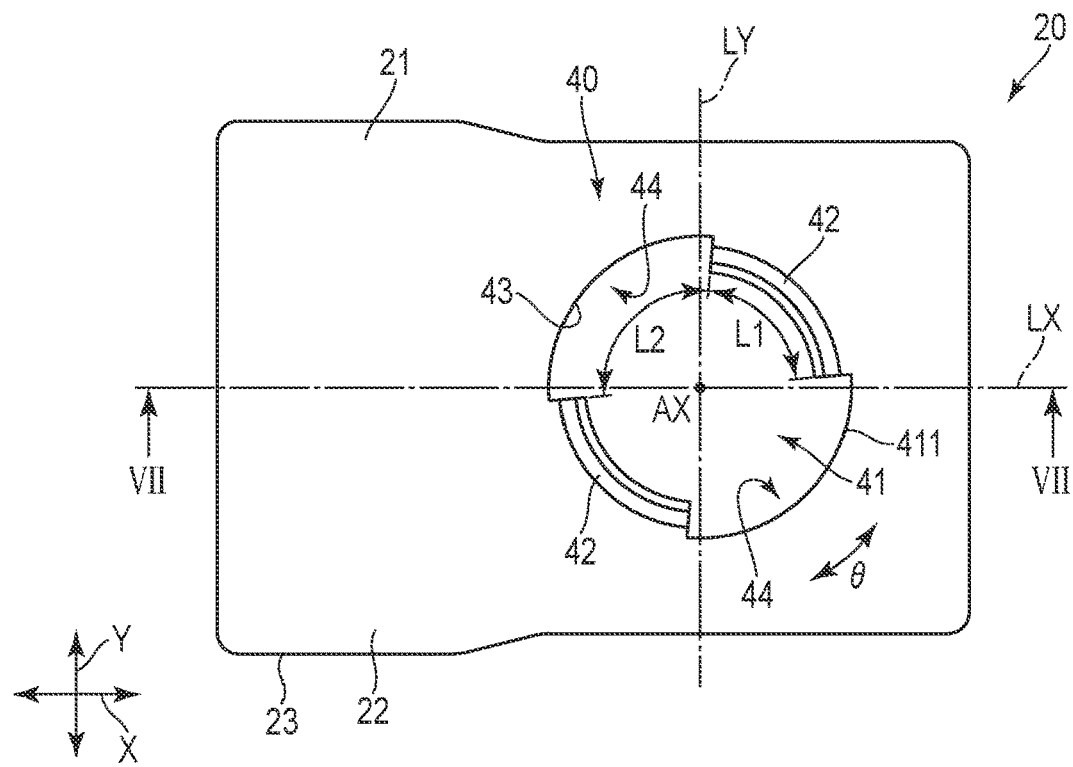
FIG. 5 is a schematic plan view showing a base plate shown in FIG. 3.
Figure 6:
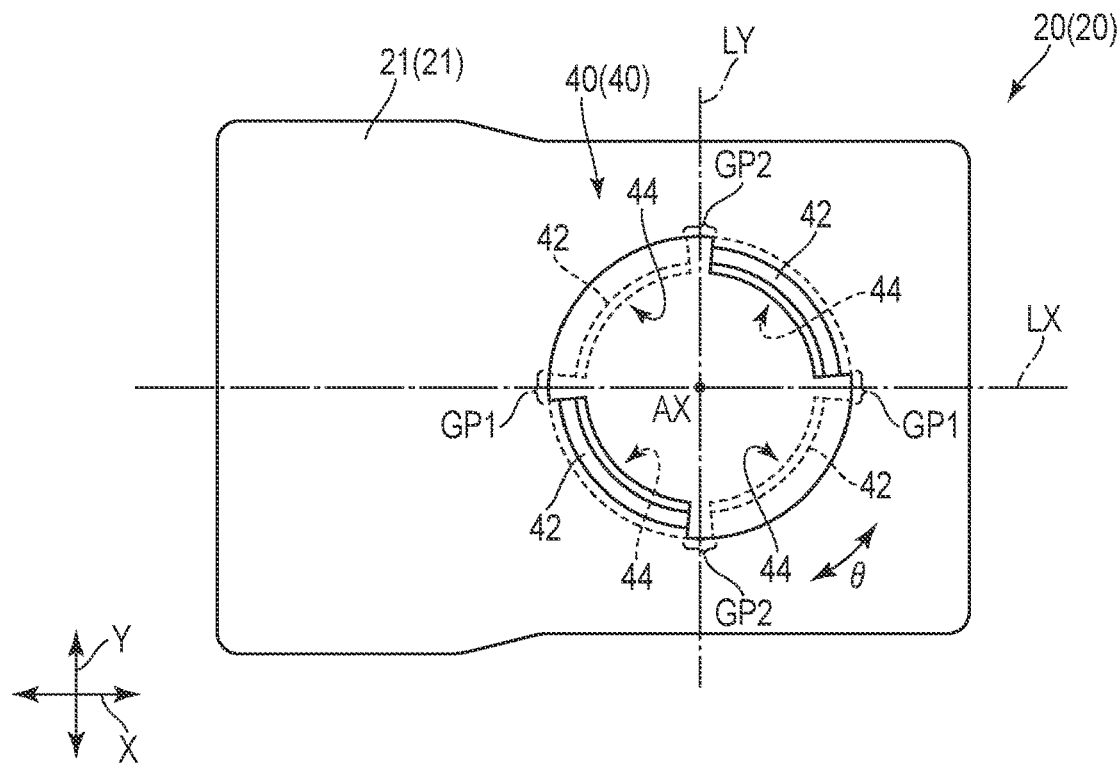
FIG. 6 is a view illustrating a case of making base plates overlap according to the first embodiment.
Figure 7:
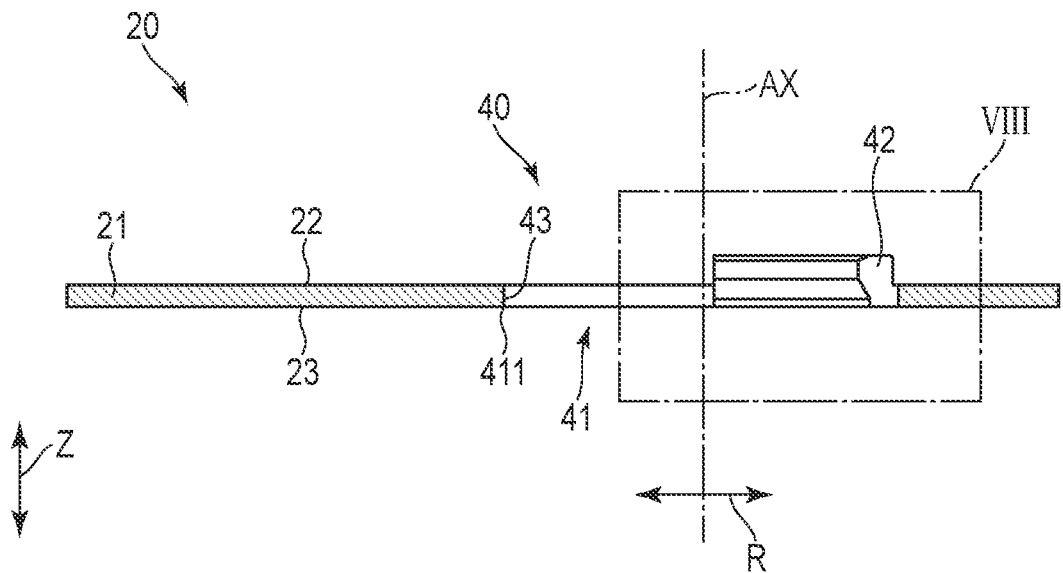
FIG. 7 is a schematic cross-sectional view showing the base plate taken along line VII-VII in FIG. 5.
Figure 8:
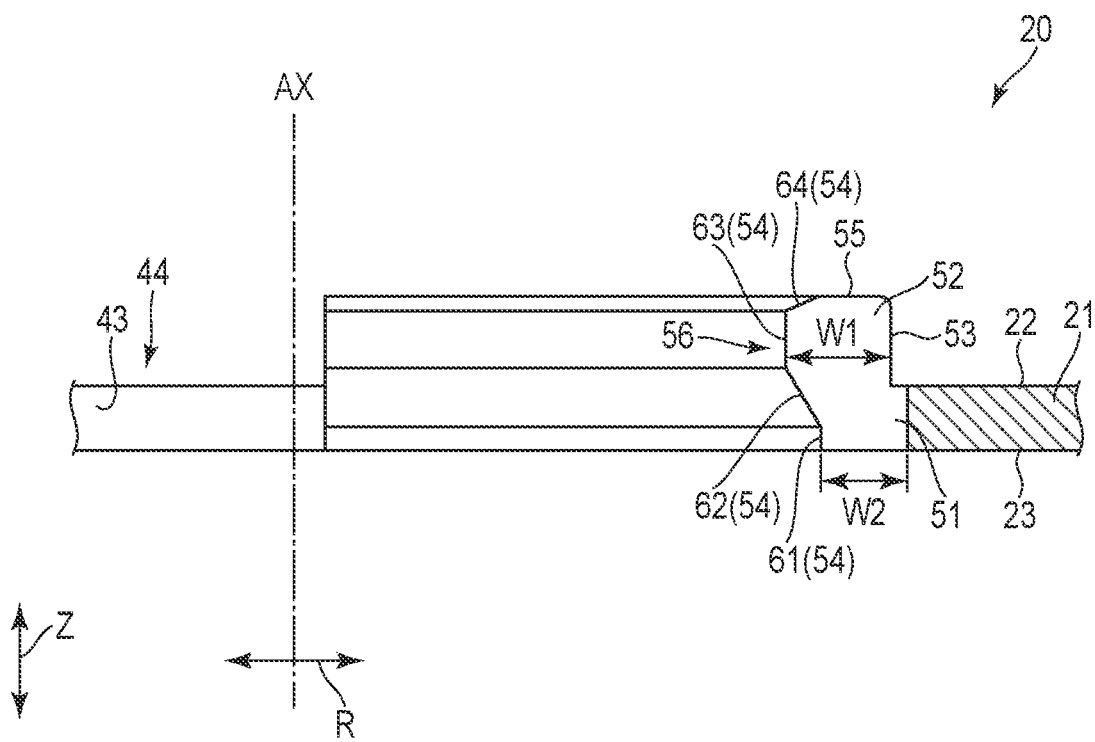
FIG. 8 is a schematic, partially enlarged view showing a part VIII in FIG. 7.

FIG. 5 is a schematic plan view showing the base plate 20 shown in FIG. 3. FIG. 6 is a view illustrating a case of making the base plates 20 overlap according to the first embodiment. FIG. 7 is a schematic cross-sectional view showing the base plate 20 taken along line VII-VII in FIG. 5. FIG. 8 is a schematic, partially enlarged view showing a part VIII in FIG. 7. As described above, the base plate 20 comprises the plate body 21 and the connection portion 40.

The plate body 21 is formed in a shape of a flat plate. As an example, the plate body 21 has a length in the longitudinal direction X greater than that in the transverse direction Y. The plate body 21 has a first surface 22 and a second surface 23 on a side opposite to the first surface 22 in the thickness direction Z. As an example, the first surface 22 is a face opposed to the arm 8 to which the base plate 20 is connected.

The connection portion 40 includes the through hole 41, the plurality of protrusions 42, and the inner circumferential surface 43 formed by the through hole 41 and the plurality of protrusions 42. The inner circumferential surface 43 includes a plurality of (for example, two) recesses 44. The connection portion 40 is formed by, for example, coining using a die set.

The through hole 41 passes through the first surface 22 and the second surface 23 in the thickness direction Z. In the example shown in FIG. 5, the through hole 41 is formed, for example, approximately at the center of the plate body 21 in the transverse direction Y. From the other viewpoint, the center of the through hole 41 is to at a position equidistant from a pair of edges aligned in the transverse direction Y of the plate body 21.

In FIG. 5 and the following figures, a line passing through the center of the through hole 41 is referred to as a central axis AX. The central axis AX extends in a direction parallel to the thickness direction Z. A direction of separating from the central axis AX about the central axis AX is defined as a radial direction R, and a circumferential direction θ about the central axis AX is defined. The radial direction R is a direction that intersects (for example, orthogonal to) the thickness direction Z.

As shown in FIG. 5, a line which intersects the central axis AX of the through hole 41 and which is parallel to the longitudinal direction X is referred to as a line LX, and a line which intersects the central axis AX of the through hole 41 and which is parallel to the transverse direction Y is referred to as a line LY. In the example shown in FIG. 5, the line LX is located approximately at the center of the plate body 21 in the transverse direction Y.

The plurality of protrusions 42 are inserted into attachment holes 82 (shown in FIG. 2) provided in the arm 8. The plurality of protrusions 42 are provided along an edge 411 of the through hole 41 in the circumferential direction θ. A plurality of discontinuous protrusions 42 are formed along the circumferential direction θ, on the inner circumferential surface 43. The plurality of protrusions 42 have a point symmetry about the central axis AX. The plural of protrusions 42 have the same shape.

As shown in FIG. 5, the plurality of protrusions 42 protrude toward the central axis AX on the inner circumferential surface 43. The plurality of recesses 44 are formed between the plurality of protrusions 42 in the circumferential direction θ, respectively. From the other viewpoint, the plurality of recesses 44 are portions which are more recessed outside in the radial direction R than the plurality of protrusions 42, on the inner circumferential surface 43.

In the example shown in FIG. 5, the plurality of protrusions 42 do not overlap the line LX or LY. Each of the plurality of protrusions 42 has a first length L1. The first length L1 is the length of the protrusions 42 along the circumferential direction θ.

Each of the plurality of recesses 44 has a second length L2. The second length L2 is the length of the recesses 44 along the circumferential direction θ. The second length L2 corresponds to an interval between the protrusions 42 opposed in the circumferential direction θ. In the example shown in FIG. 5, the second length L2 is greater than the first length L1.

From the other viewpoint, an angle in the circumferential direction θ of a range in which the protrusions 42 are formed on the inner circumferential surface 43 is smaller than an angle obtained by dividing 360 degrees by twice the number of protrusions 42. As an example, the angle in the circumferential direction θ of the range in which one protrusion 42 is formed is smaller than 90 degrees. For example, the angle in the circumferential direction θ of the range in which each of the protrusions 42 is formed is equal.

In FIG. 6, one base plate 20 overlaps with the other base plate 20, which is rotated about the line LX by 180 degrees. In FIG. 6, the other base plate 20 is represented by a broken line. In this case, the first surface 22 of one base plate 20 is opposed to the first surface 22 of the other base plate 20, in the thickness direction Z.

When a pair of base plates 20 are made to overlap as described above, the plurality of protrusions 42 of one base plate 20 overlap with the plurality of recesses 44 of the other base plate 20, and the plurality of recesses 44 of the other base plate 20 overlap with the plurality of recesses 44 of one base plate 20. The plurality of protrusions 42 of one base plate 20 do not overlap with the plurality of protrusions 42 of the other base plate 20. The protrusions 42 of one base plate 20 and the protrusions 42 of the other base plate 20 are alternately arranged in the circumferential direction θ.

As shown in FIG. 6, each of a cap GP1 overlapping with the line LX and a gap GP2 overlapping with the line LY is formed between the protrusion 42 of one of adjacent base plates 20 and the protrusion 42 of the other base plate 20, in the circumferential direction θ.

In the example shown in FIG. 6, a length of the cap GP1 in circumferential direction θ is approximately equal to a length of the gap GP2 in circumferential direction θ. The plurality of recesses 44 of the other base plate 20 rotated at 180 degrees about the line LX can be made to overlap with the plurality of protrusions 42 of one base plate 20, by arranging the plurality of protrusions 42 as described above.

Next, the protrusions 42 will be described.

As shown in FIG. 7 and FIG. 8, the protrusion 42 protrudes from the second surface 23 toward the first surface 22 in the thickness direction Z. The protrusion 42 includes a proximal portion 51 connected to the plate body 21 and an extending portion 52 further extending than the plate body 21 in the thickness direction Z.

As an example, the proximal portion 51 corresponds to an area between the first surface 22 and the second surface 23 in the thickness direction Z, and the extending portion 52 corresponds to an area other than the proximal portion 51. In the example shown in FIG. 7 and FIG. 8, the extending portion 52 corresponds to an area extending upward in the figure from the first surface 22.

The protrusion 42 has an outer surface 53 located outside in the radial direction R, an inner surface 54 located inside in the radial direction R, and an end surface 55 which connects the inner surface 54 with the outer surface 53. The outer surface 53 is formed on the extending portion 52 and is connected to the first surface 22.

In the example shown in FIG. 7 and FIG. 8, the outer surface 53 extends parallel to the central axis AX. Being parallel may imply a slight inclination. An angle formed by the outer surface 53 and the first surface 22 is, for example, 90 degrees.

The end surface 55 is located on a side opposite to the proximal portion 51 in the thickness direction Z. The end surface 55 corresponds to one end of the extending portion 52. In the example shown in FIG. 7 and FIG. 8, the end surface 55 is a surface approximately parallel to the radial direction R.

The inner surface 54 constitutes a part of the inner circumferential surface 43 of the connection portion 40. The inner surface 54 is formed on the proximal portion 51 and the extending portion 52. The inner surface 54 includes a back hole surface 61, an inclined surface 62, a pressing surface 63, and an inclined surface 64. The back hole surface 61, the inclined surface 62, the pressing surface 63, and the inclined surface 64 are arranged in this order from the second surface 23 side, in the thickness direction Z.

The back hole surface 61 is located at a proximal portion 51 and is connected to a second surface 23. The back hole surface 61 extends parallel to the central axis AX. The pressing surface 63 is located at the extending portion 52. The pressing surface 63 extends parallel to the central axis AX. The pressing surface 63 is parallel to the outer surface 53. As an example, a length of the pressing surface 63 in the thickness direction Z is greater than a length of the back hole surface 61 in the thickness direction Z.

As shown in FIG. 7 and FIG. 8, the pressing surface 63 is located more closely to the central axis AX side than the back hole surface 61, the inclined surface 62, and the inclined surface 64, in the radial direction R. From another viewpoint, a length from the central axis AX to the pressing surface 63 in the radial direction R is smaller than a length from the central axis AX to each of the back hole surface 61, the inclined surface 62, and the inclined surface 64 in the radial direction R. On the inner surface 54, a length from the central axis AX to the back hole surface 61 in the radial direction R is the greatest.

The inclined surface 62 is formed to extend from the proximal portion 51 to the extending portion 52 and connects the back hole surface 61 with the pressing surface 63. The inclined surface 62 is inclined from the back hole surface 61 toward the pressing surface 63 so as to approach the central axis AX, in the thickness direction Z.

The inclined surface 64 is located at the extending portion 52 and connects the pressing surface 63 with the end surface 55. The inclined surface 64 is inclined from the pressing surface 63 toward the end surface 55 so as to be remote from the central axis AX, in the thickness direction Z. As an example, a length of the inclined surface 62 in the thickness direction Z is greater than a length of the inclined surface 64 in the thickness direction Z.

The protrusion 42 further includes a pressing portion 56. The pressing portion 56 is located between the proximal portion 51 and the end surface 55, in the thickness direction Z. In the radial direction R, the pressing portion 56 is located inside the protrusion 42 in the radial direction R.

The pressing portion 56 is, for example, an area of the extending portion 52, which includes the pressing surface 63. The protrusion 42 has the greatest width in the pressing portion 56. The width is the length of the protrusion 42 along the radial direction R. The width in the radial direction R of the pressing portion 56 is referred to as width W1, and the width the radial direction R of the proximal portion 51 is referred to as width W2.

The width W1 in the radial direction R of the pressing portion 56 is, for example, the length from the pressing surface 63 to the outer surface 53 in the radial direction R. The width W2 of the proximal portion 51 in the radial direction R is the length from the back hole surface 61 to the inner circumferential surface 43 constituting the recessed portion 44 in the radial direction R. The width W1 of the pressing portion 56 in the radial direction R is greater than the width W2 of the proximal portion 51 in the radial direction R.

Figure 9:
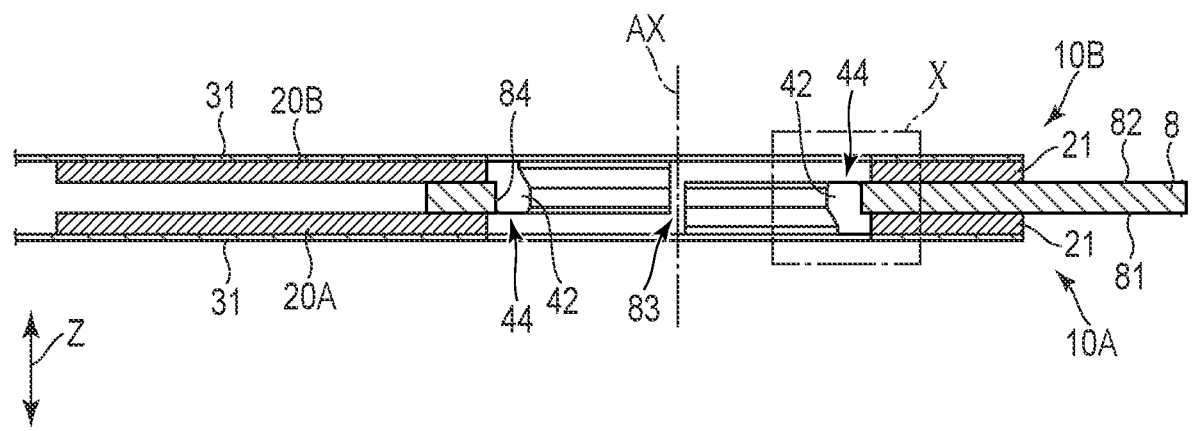
FIG. 9 is a schematic, partially cross-sectional view showing the suspension and the arm in FIG. 2.
Figure 10:
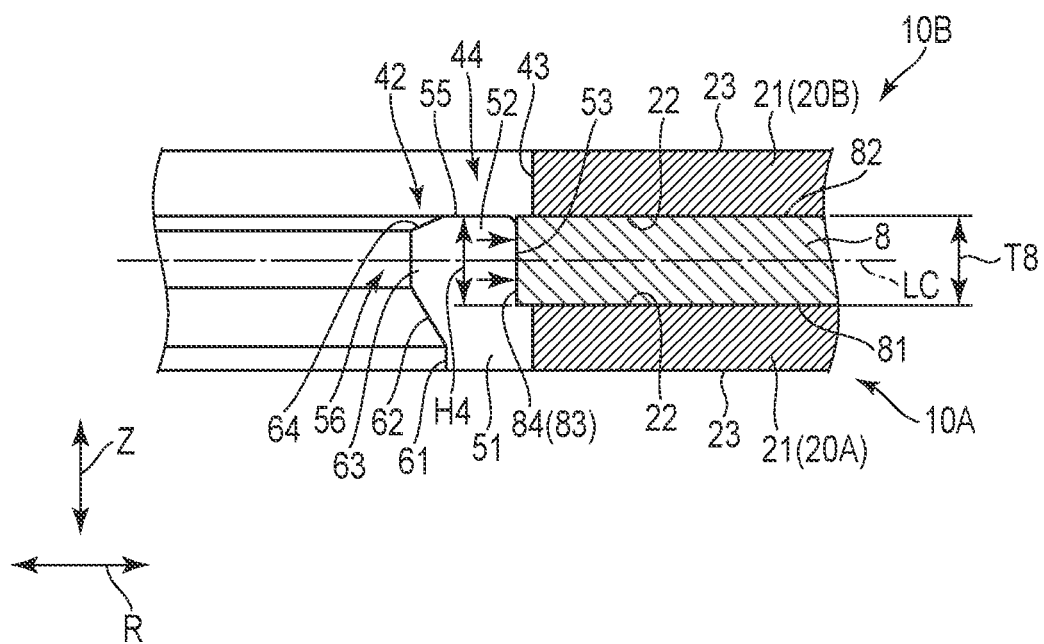
FIG. 10 is a schematic, partially enlarged view showing a part X in FIG. 9.

FIG. 9 is a schematic, partially cross-sectional view showing the suspension 10 and the arm 8 in FIG. 2. FIG. 10 is a schematic, partially enlarged view showing a part X in FIG. 9. FIG. 9 and FIG. 10 show the arm 8 and parts of the first suspension 10A and the second suspension 10B connected to the arm 8. In FIG. 10, illustration of the load beam 31 is omitted.

The arm 8 has a first attachment surface 81, a second attachment surface 82 on a side opposite to the first attachment surface 81, and an attachment hole 83 that passes through the first attachment surface 81 and the second attachment surface 82 the thickness direction Z. The attachment hole 83 is provided on the distal end side of the arm 8. The attachment hole 83 has, for example, a circular shape in planar view. The attachment hole 83 has an inner circumferential surface 84.

The first suspension 10A comprises a base plate 20A and the second suspension 10B comprises a base plate 20B. The base plate 20A corresponds to a first base plate and the base plate 20B corresponds to a second base plate.

The base plates 20A and 20B have the same shape as the base plate 20 described above. In FIG. 9 and FIG. 10, the base plates 20A and 20B are connected to the arm 8 such that the first surfaces 22 are opposed to each other.

In the example shown in FIG. 9 and FIG. 10, the first suspension 10A is connected to the arm 8 from the first attachment surface 81 side, and the second suspension 10B is connected to the arm 8 from the second attachment surface 82 side. Each of the base plates 20A and 20B is connected to the arm 8 via the attachment hole 83. In this case, the central axis AX of the through hole 41 is coincident with the central axis AX of the attachment hole 83.

The first surface 22 of the base plate 20A is in contact with the first attachment surface 81, and the first surface 22 of the base plate 20B is in contact with the second attachment surface 82. Each of a plurality of protrusions 42 of the base plates 20A and 20B is inserted into the attachment hole 83. In the attachment hole 83, the protrusions 42 of the base plate 20A and the protrusions 42 of the base plate 20B are alternately arranged in the circumferential direction θ as described with reference to FIG. 6.

In the example shown in FIG. 9 and FIG. 10, the plurality of protrusions 42 of the base plate 20A overlap with the plurality of recesses 44 of the base plate 20B, and the plurality of recesses 44 of the base plate 20A overlap with the plurality of protrusions 42 of the base plate 20B, in the thickness direction Z. The outer surfaces 53 are in contact with the inner circumferential surfaces 84, respectively.

In FIG. 10, a thickness of the arm 8 is referred to as thickness T8, and a height of the protrusion 42 is referred to as height H4. The height H4 of the protrusion 42 is the length from the first surface 22 to the end surface 55 in the thickness direction Z. The thickness T8 of the arm 8 is the length from the first attachment surface 81 to the second attachment surface 82 in the thickness direction Z. In the example shown in FIG. 10, the height H4 of the protrusion 42 is approximately equal to the thickness T8 of the arm 8. From the other viewpoint, the end surface 55 is located flush with the second attachment surface 82 in the thickness direction.

The pressing surface 63 overlaps with the inner circumferential surface 84 in the radial direction R. The pressure portion 56 is provided such that the center of the pressing surface 63 in the thickness direction Z overlaps with the center of the inner circumferential surface 84 in the thickness direction Z, in the radial direction R.

In FIG. 10, a line which is equidistant from the first attachment surface 81 and the second attachment surface 82 and which parallel to the radial direction R is represented as a line LC, in the thickness direction Z. In the example shown in FIG. 10, the center of the pressing surface 63 in the thickness direction Z intersects the line LC.

When connecting the base plate 20 with the arm 8, the plurality of protrusions 42 are pushed outward an the radial direction R as indicated by arrows in FIG. 10, in a state where the plurality of protrusions 42 are inserted into the attachment holes 83, and the inner circumferential surface 84 and the outer surface 53 are brought into close contact with each other by plastically deforming the plurality of protrusions 42 outward in the radial direction R.

The plurality of protrusions 42 can be pushed outward in the radial direction R through the pressing portions 56 by, for example, making balls pass through the attachment holes 83 of the arms 8 in the thickness direction Z, in a state where the plurality of protrusions 42 are inserted into the attachment holes 83.

The balls are formed of a metallic material that is harder than the metallic material forming the base plate 20. The ball is formed of, for example, stainless steel or the like. A diameter of the ball is larger than the inner diameter of the inner circumferential surface formed by the pressing surface 63. Such a connection between parts may be referred to as a swaging process or the like.

The plurality of protrusions 42 are pushed outward in the radial direction R by making the above-mentioned balls pass through the attachment holes 83 along the thickness direction Z. As a result, the outer surface 53 is brought into close contact with the inner circumferential surface 84, and the base plate 20 is fixed to the arm 8. A force applied outward in the radial direction R in a case where the ball passes through the pressing portion 56 becomes greatest, by forming the pressing portion 56 as described with reference to FIG. 10.

The inclined surfaces 62 and 64 connected to the pressing surface 63 function as guides for making the ball pass toward the pressing surface 63. For this reason, the resistance in a case of making the ball pass through the attachment hole 83 is reduced, such that the ball can easily be made to pass through the attachment hole 83 along the thickness direction Z. From the other viewpoint, the load in the thickness direction Z on the ball in a case where the ball is made to pass through the attachment hole 83 can be reduced. Such load may be referred to as a swaging force or the like.

Figure 12:
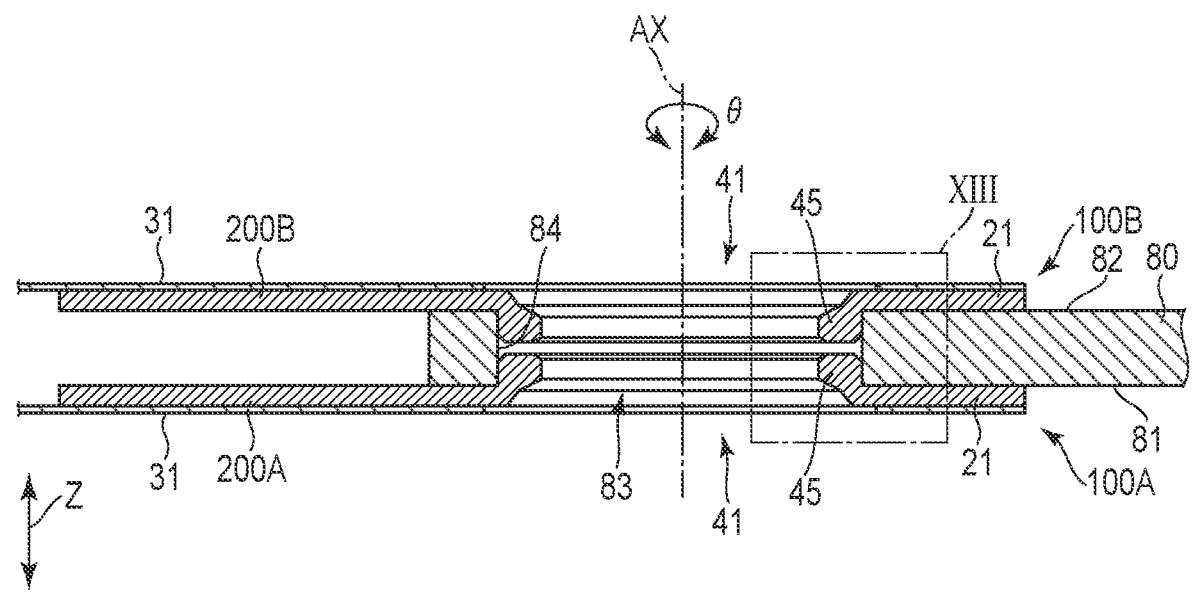
FIG. 12 is a schematic, partially cross-sectional view showing the suspension and the arm shown in FIG. 11.
Figure 13:
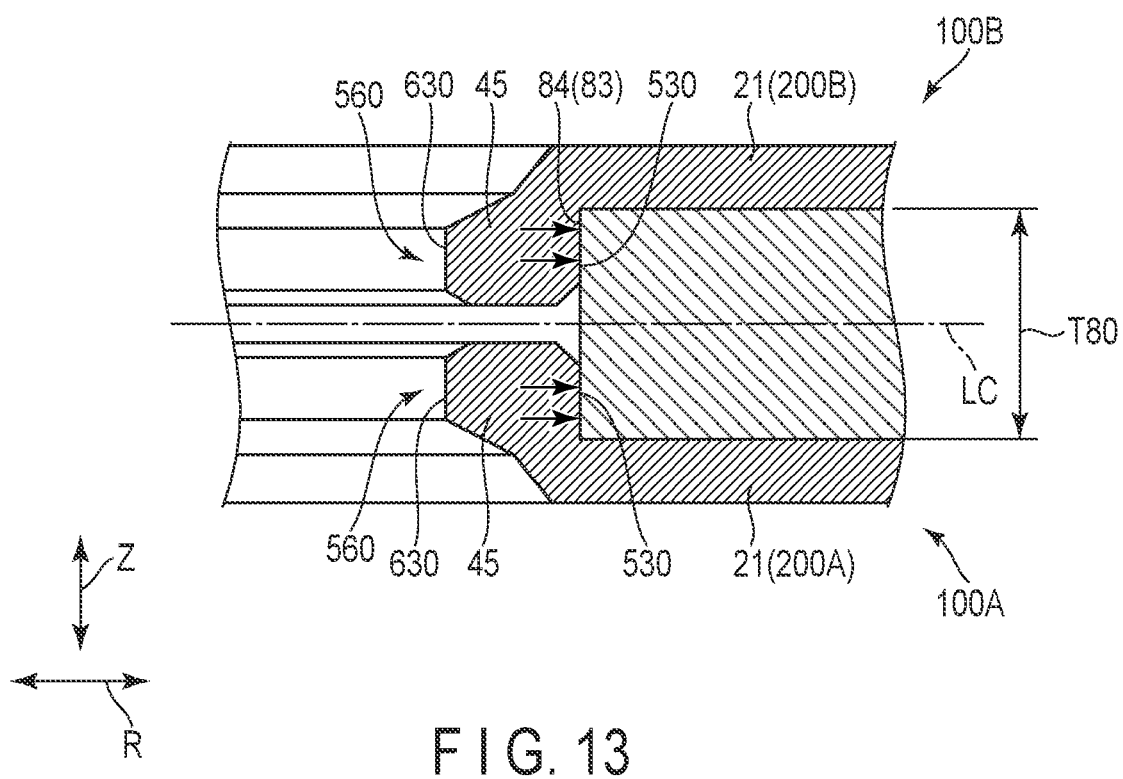
FIG. 13 is a schematic, partially enlarged view showing a part XIII in FIG. 12.

FIG. 11 is a view showing a comparative example of the base plate 20 according to the first embodiment. A FIG. 12 is a schematic, partially cross-sectional view showing a suspension 100 and an arm 80 shown in FIG. 11. FIG. 13 is a schematic, partially enlarged view showing a part XIII in FIG. 12.

As shown in FIG. 11, the suspension 100 comprises a base plate 200. The connection 40 of the base plate 200 includes a through hole 41 and a cylindrical boss 45. The boss 45 is provided along the edge of the through hole 41. A height of the boss 45 along the thickness direction is approximately equal to a height H4 of the projection.

As shown in FIG. 12 and FIG. 13, a first suspension 100A comprises a base plate 200A, and a second suspension 100B comprises a base plate 200B. The base plates 200A and 200B have the same shape as the above-described base plate 200.

In the example shown in FIG. 12 and FIG. 13, the first suspension 100A is connected to the arm 80 from the first attachment surface 81 side, and the suspension 100B is connected to the arm 80 from the second attachment surface 82 side.

Each of a boss 45 of the base plate 200A and a boss 45 of the base plate 200B is inserted into the attachment hole 83. Outer surfaces 530 of the bosses 45 are in contact with the inner circumferential surfaces 84, respectively. The boss 45 of the base plate 200A overlaps with the boss 45 of the base plate 200A in the thickness direction Z. A gap is formed between the boss 45 of the base plate 200A and the boss 45 of the base plate 200B, in the thickness direction Z.

For this reason, the arm 80 needs to have a predetermined thickness in order to connect the first suspension 100A with the second suspension 100B. A thickness T80 of the arm 80 shown in FIG. 13 is greater than the thickness T8 of the arm 8 shown in FIG. 10. As an example, when the height of the boss 45 is approximately equal to the height H4 of the protrusion 42, the thickness T80 of the arm 80 needs to be twice or more as great as the thickness T8 of the arm 8.

The boss 45 includes a pressing portion 560 formed inside in the radial direction R, along the circumferential direction θ. Pressing surfaces 630 are provided on the pressing portions 560. The pressing surfaces 630 are aligned in the thickness direction Z. The pressing surfaces 630 overlap with the inner circumferential surfaces 84, in the radial direction R.

As mentioned above, a gap is formed between the bosses 45 in the thickness direction Z. As shown in FIG. 13, the center of the inner circumferential surface 84 in the thickness direction Z does not overlap with the pressing surface 630, in the radial direction R, in terms of the attachment hole 83.

In the base plate 20 configured as described above, the connection portion 40 includes the through hole 41, the plurality of protrusions 42, and the plurality of recesses 44 formed between the plurality of protrusions 42. In the base plates 20, when a pair of base plates 20 are connected to the arms 8, the plurality of protrusions 42 of one base plate 20 can be made to overlap with the plurality of recesses 44 of the other base plate 20, and the plurality of protrusions 42 of the other base plate 20 can be made to overlap with the plurality of recesses 44 of one base plate 20.

From the other viewpoint, the plurality of protrusions 42 of one base plate 20 do not overlap with the plurality of protrusions 42 of the other base plate 20. As a result, the thickness T8 of the arms 8 connecting the base plates 20 can be reduced and the arms 8 can be made thinner.

With the suspension 10 comprising such a base plate 20, the thickness T8 of the arms 8 can be reduced. The carriage 6 including the arms 8 can be thereby made smaller. As a result, the thickness of the disk drive 1 can be suppressed and the disk drive 1 can be made thinner.

The interval between the disks 4 can be made smaller and the disks 4 can be provided in the casing 2 by reducing the thickness T8 of the arms 8. Furthermore, since more arms 8 can be provided in the carriage 6 having the same height as a conventional carriage, more disks 4 can be provided in the same casing 2 as a conventional carriage.

With the base plate 20, the thickness T8 of the arms 8 can be reduced without making the height H4 of the protrusions 42 smaller than the height of the bosses 45, as compared to the base plate 200 described with reference to FIG. 11 to FIG. 13.

Although the thickness T8 of the arms 8 is smaller, the length in which the outer surface 53 is in contact with the inner circumferential surface 84 is the same as the length in which the bosses 45 are in contact with the inner surfaces, in the thickness direction Z. For this reason, the base plates 20 can be securely connected to the arms 8.

Since the plurality of protrusions 42 are formed discontinuously in the circumferential direction θ, the plurality of protrusions 42 are easily pushed outward in the radial direction R. With the base plate 20, the load in the thickness direction Z on the ball in making the ball pass through the attachment hole 83 does not need to be increased as compared to the base plate 200 described with reference to FIG. 11 to FIG. 13. For this reason, the connection between the base plates 20 and the arms 8 can easily be made.

An influence (for example, deformation) to the base plate 20 when connecting the base plate 20 to the arm 8 can be suppressed by reducing the load on the ball in the thickness direction Z. The influence to the characteristics of the suspension 10 caused by the base plate 20 can be thereby suppressed.

When a failure is found in a magnetic head during the post-assembly inspection of the disk drive 1, the head gimbal assembly is reconfigured to replace the defective head. In this case, the base plate needs be detached from the arm.

For example, it is assumed that a pair of base plates including bosses are connected to an arm. In a state in which the outer surface of the boss of one base plate overlaps with the inner surface of the boss of the other base plate in the radial direction R in the attachment hole of the base plate, each boss is plastically deformed toward the outer side of the radial direction R (interlock). When the base plate is connected to the arm by interlocking, the base plate is difficult to detach from the arm and the head gimbal assembly is difficult to replace.

As regards the base plate 20, since the inner circumferential surface 84 is brought into close contact with the outer surfaces 53 of the plurality of protrusions 42 to connect the base plate 20 with the arm 8, the base plate 20 can easily be detached from the arm 8 as compared to the case where the base plate is connected to the arm by interlocking. For this reason, only the head gimbal assembly including the defective head can easily be reassembled during the post-assembly inspection of the disk device 1.

In other words, as regards the base plate 20 of the embodiment, the base plate 20 and the arm 8 can be connected securely, and the base plate 20, the suspension 10, and the disk drive 1 which are excellent in workability can be provided.

In the base plate 20, the plurality of recesses 44 have the second length L2 greater than the first length L1 of the plurality of protrusions 42. When the pair of base plates 20 overlap, the gaps GP1 and GP2 are formed between the adjacent protrusions 42 as described with reference to FIG. 6.

For this reason, the plurality of protrusions 42 of one base plate 20 can easily be made to overlap with the plurality of recesses 44 of the other base plate 20, and the pair of suspensions 10 can easily be connected to the arms 8.

The plurality of recesses 44 of the other base plate 20 rotated at 180 degrees about the line LX can be made to overlap with the plurality of protrusions 42 of one base plate 20, by arranging the plurality of protrusions 42 as performed in the embodiment.

As a result, the same base plates can be used as the base plates 20 provided in the suspensions 10 opposed with the arm 8 interposed there between, similarly to the first suspension 10A and the second suspension 10B.

As described with reference to FIG. 10, the pressing portion 56 is provided such that the center of the pressing surface 63 in the thickness direction Z overlaps with the center of the inner circumferential surface 84 in the thickness direction Z, in the radial direction R. Thus, when the ball is passed through the attachment hole 83 along the thickness direction Z, the inner circumferential surface 84 including the center of the inner circumferential surface 84 in the thickness direction Z can be pressed from the outer surface 53. As a result, the outer surface 53 can be brought into close contact with the inner circumferential surface 84, and the base plate 20 can be securely connected to the arm 8.

Variation in the load on the arm 8 in the thickness direction Z can be suppressed by pressing the inner circumferential surface 84 from the outer surface 53 via the pressing portion 56 as described above. As a result, the deformation of the arm 8 (for example, warping of the arm 8) which occurs when the base plate 20 is connected to the arm 8 can be suppressed.

According to the embodiment, the base plate 20, the suspension 10, and the disk device 1 which allow the arm 8 to be thinner can be provided. In addition to the above described actions, various suitable actions can be obtained from the embodiment.

Next, other embodiments will be described. In the other embodiments and modified examples described below, the same constituent elements as those in the first embodiment described above are denoted by the same reference numerals and their detailed descriptions may be omitted or simplified. A base plate 20 of each of the following embodiments can be applied to a suspension 10, and a disk device 1 comprising the suspension 10 can be constituted.

Second Embodiment

Figure 14:
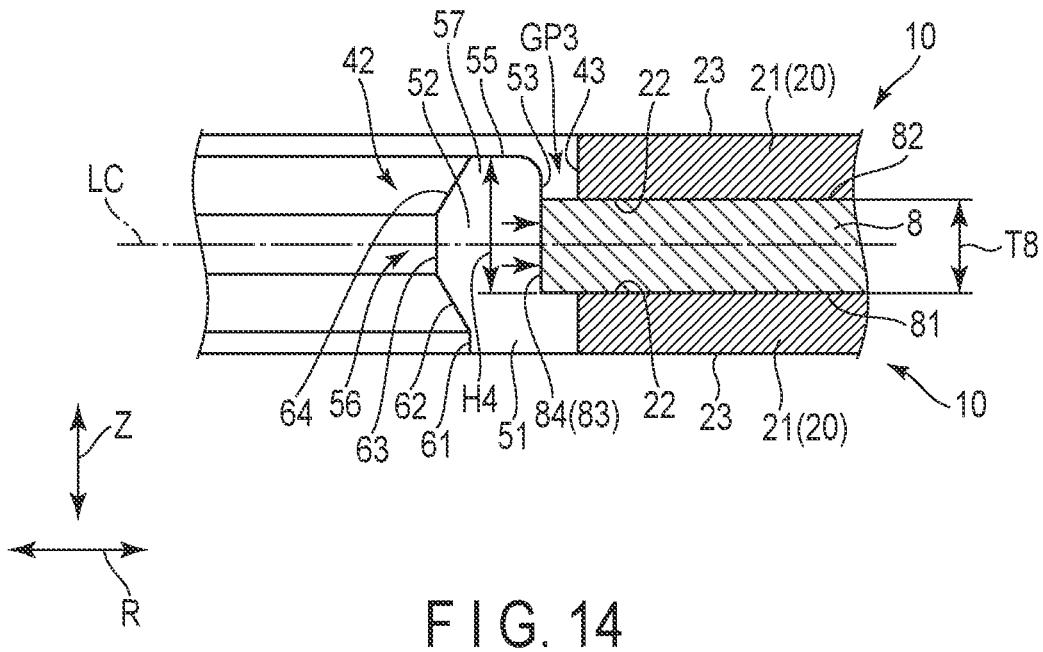
FIG. 14 is a schematic, partially cross-sectional view showing a base plate and an arm according to a second embodiment.

FIG. 14 a schematic, partially cross-sectional view showing a base plate 20 and an arm 8 according to a second embodiment. As shown in FIG. 14, an extending portion 52 includes a lug portion 57. The lug portion 57 is an area which protrudes more than an attachment hole 83 when a protrusion 42 is inserted into an attachment hole 83. An end surface 55 is located at the lug portion 57. In terms of the arm 8, a height H4 of the protrusion 42 is greater than a thickness T8 of the arm 8.

The height H4 of the protrusion 42 is greater than the height H4 of the protrusion 42 of the first embodiment described with reference to FIG. 10. A gap GP3 is formed between an outer surface 53 and an inner circumferential surface 43 in the radial direction R. In the example shown in FIG. 14, a center of a pressing surface 63 in the thickness direction Z is provided to overlap with a center of an inner circumferential surface 84 in the thickness direction Z, in the radial direction R.

In the configuration of the base plate 20 of the second embodiment, too, the same advantages as those of the first embodiment can be obtained. The base plate 20 of the second embodiment is deformed such that a part of the lug portion 57 falls toward a gap GP3 when a ball passes through an attachment hole 83 along the thickness direction Z. When a part of the lug portion 57 is deformed, the deformed portion is located in the gap GP3. For this reason, the deformed portion overlaps with the arm 8 in the thickness direction Z.

Thus, the base plate 20 can hardly be detached from the aria 8 in the thickness direction Z by the deformed portion. As regards the base plate 20 of the second embodiment, the base plate 20 can be connected more firmly to the arm 8 as compared with the first embodiment.

Third Embodiment

Figure 15:
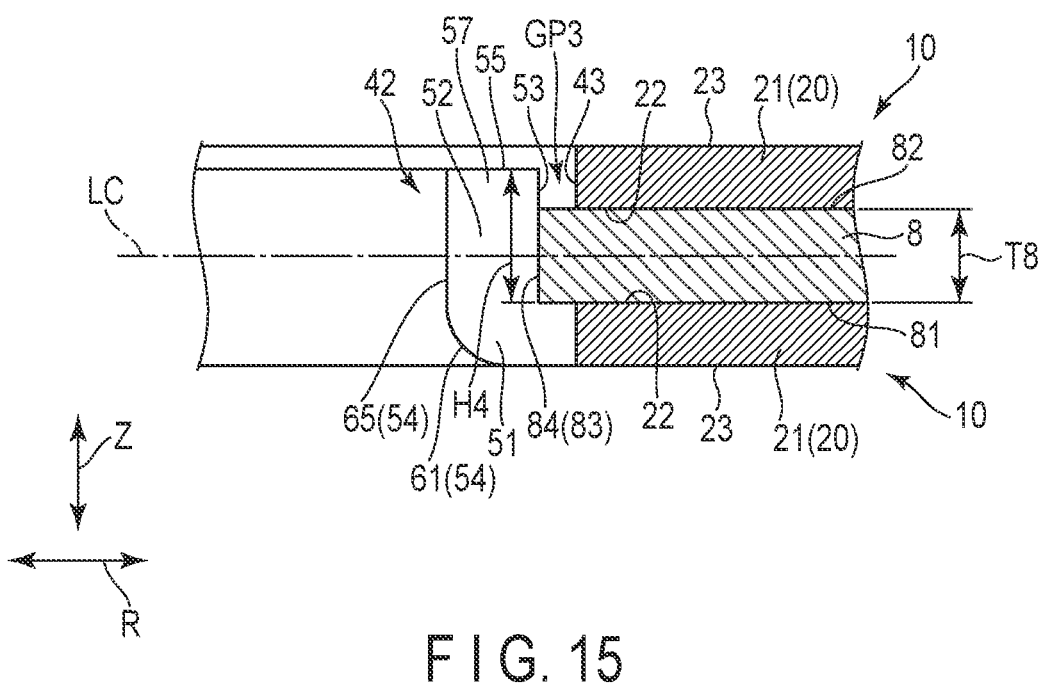
FIG. 15 is a schematic, partially cross-sectional view showing a base plate and an arm according to a third embodiment.

FIG. 15 is a schematic, partially cross-sectional view showing a base plate 20 and an arm 8 according to a third embodiment. An inner surface 54 includes a back hole surface 61 and a parallel surface 65. The back hole surface 61 is located at a proximal portion 51 and is connected to a second surface 23. In the example shown in FIG. 15, the back hole surface 61 is arcuate. A parallel surface 65 is formed to extend from the proximal portion 51 to an extending portion 52 and connects the back hole surface 61 with an end surface 55.

The parallel surface 65 is a surface approximately parallel to an outer surface 53. The parallel surface 65 extends substantially parallel to a central axis AX. The parallel surface 65 includes an area corresponding to the pressing surface 63 of the first embodiment. The extending portion 52 includes a lug portion 57. A gap GP3 is formed between an outer surface 53 and an inner circumferential surface 84. A protrusion 42 of the third embodiment is formed by, for example, a burring process.

In the configuration of the base plate 20 of the third embodiment, too, the same advantages as those of each of the above-described embodiments can be obtained. Since the protrusion 42 can be formed by the burring process, the base plate 20 can be manufactured at a lower cost than that in the coining process. More specifically, the costs for a mold for manufacturing the base plate 20 can be reduced. The extending portion 52 includes the lug portion 57, but may not include the lug portion 57.

Fourth Embodiment

Figure 16:
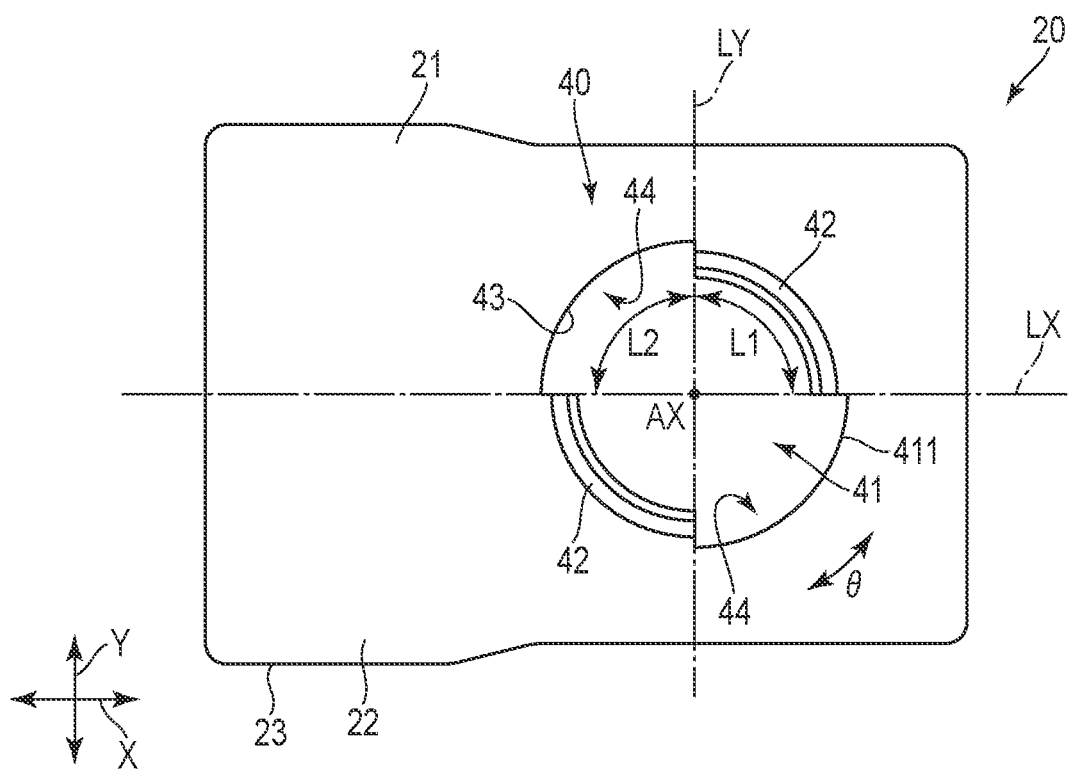
FIG. 16 is a schematic plan view showing a base plate according to a fourth embodiment.
Figure 17:
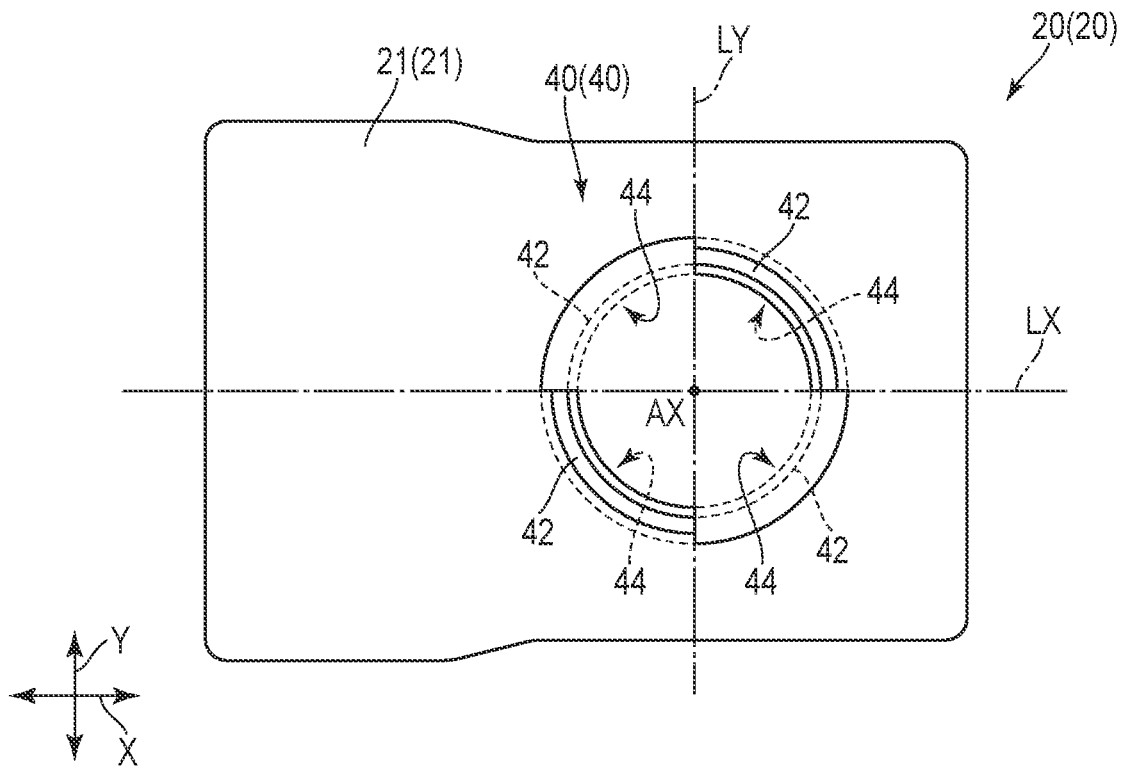
FIG. 17 is a view illustrating a case of making base plates overlap according to the fourth embodiment.

FIG. 16 is a schematic plan view showing a base plate 20 according to a fourth embodiment. FIG. 17 is a view illustrating a case of making base plates overlap according to the fourth embodiment. As shown FIG. 16, a connection 40 of the base plate 20 includes a plurality of (for example, two) protrusions 42. In the example shown in FIG. 16, too, the plurality of protrusions 42 do not overlap with a line LX or a line LY.

The first length L1 of the plurality of protrusions 42 is approximately equal to the second length of the plurality of recesses 44. From the other viewpoint, the first length L1 of the plurality of protrusions 42 shown in FIG. 16 is greater than the first length L1 of the plurality of protrusions 42 described with reference to FIG. 5. The second length L2 of the plurality of recesses 44 shown in FIG. 16 is shorter than the second length L2 of the plurality of recesses 44 described with reference to FIG. 5.

In the embodiment, an angle in the circumferential direction θ of a range where the 42 protrusions are formed is approximately equal an angle formed by dividing 360 degrees by twice the number of protrusions 42. In the example shown in FIG. 16, an angle in the circumferential direction θ of the range in which one protrusion 42 is approximately equal to 90 degrees.

In FIG. 17, one base plate 20 overlaps with the other base plate 20 that is rotated about the line LX at 180 degrees. In FIG. 17, the other base plate 20 is represented by a broken line. As shown in FIG. 17, the protrusions 42 of one base plate 20 are in close contact with the protrusions 42 of the other base plate 20, the circumferential direction θ.

In the configuration of the base plate 20 of the fourth embodiment, too, the same effects as those in each of the above-described embodiments can be obtained. With the base plate 20 of the fourth embodiment, the protrusions 42 of one base plate 20 are in close contact with the protrusions 42 of the other base plate 20.

For this reason, the positioning of the base plate 20 with respect to the attachment hole 83 of the arm 8 can be performed more easily than that of the base plate 20 described with reference to FIG. 5. More specifically, with the base plate 20 of the fourth embodiment, the positioning accuracy of the base plate 20 in the circumferential direction θ with respect to the attachment hole 83 can be improved.

Fifth Embodiment

Figure 18:
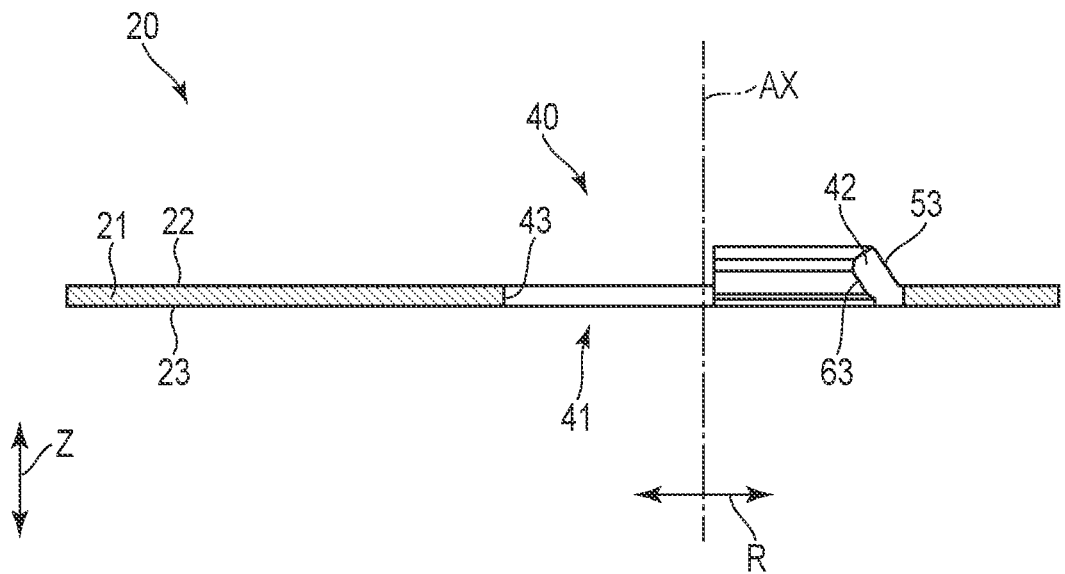
FIG. 18 is a schematic cross-sectional view showing a base plate according to a fifth embodiment.

FIG. 18 is a schematic cross-sectional view showing a base plate 20 according to a fifth embodiment. As shown in FIG. 18, protrusions 42 are inclined from a second surface 23 toward a first surface 22 in a thickness direction Z so as to approach a central axis AX.

An outer surface 53 and a pressing surface 63 are inclined from the second surface 23 toward the first surface 22 in the thickness direction Z so as to approach the central axis AX. An angle formed by the outer surface 53 and the first surface 22 is larger than 90 degrees. The angle is, for example, between 92 and 120 degrees.

In the configuration of the base plate 20 of the fifth embodiment, too, the same advantages as those of the first embodiment can be obtained. Since the plurality of protrusions 42 are formed discontinuously in the circumferential direction θ, even at the base plate 20 of the fifth embodiment, the protrusions 42 are pushed to fall outside in the radial direction R when a ball is passed through the attachment hole 83 from the second surface 23 to the first surface 22 in the thickness direction Z.

Sixth Embodiment

Figure 19:
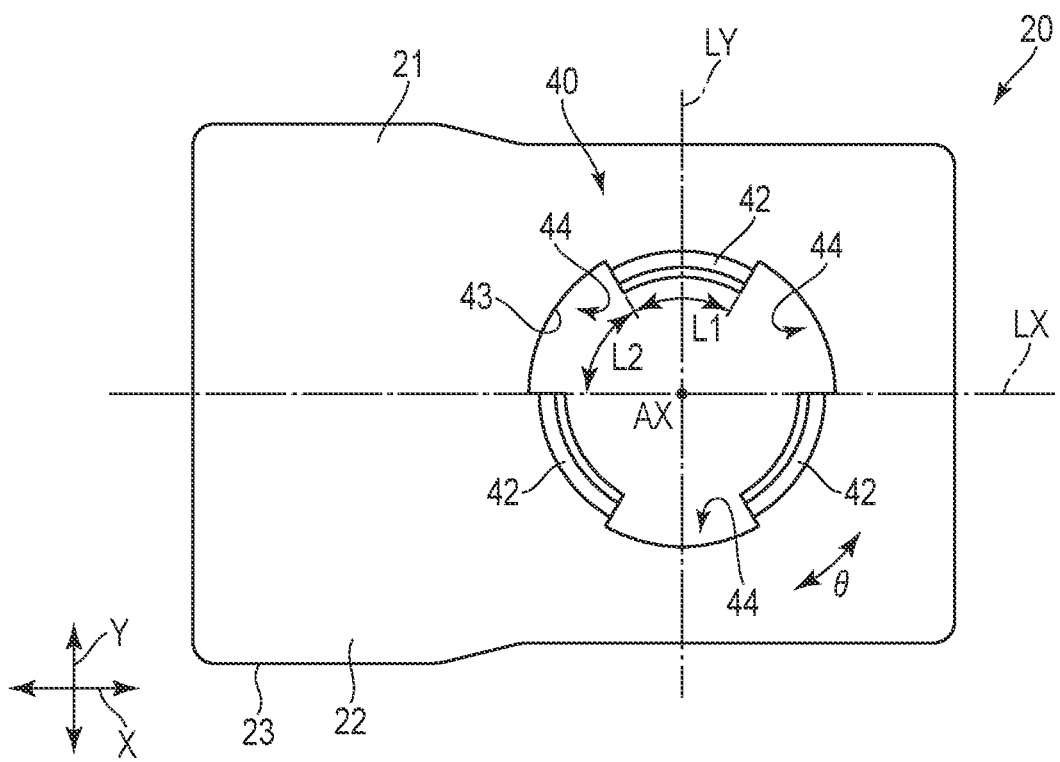
FIG. 19 is a schematic plan view showing a base plate according to a sixth embodiment.

FIG. 19 is a schematic plan view showing a base plate 20 according to a sixth embodiment. A base plate 20 of the sixth embodiment is different from that of each of the above-described embodiments in comprising three protrusions 42.

As shown in FIG. 19, a connection portion 40 of the base plate 20 includes three protrusions 42 and three recesses 44. In the example shown in FIG. 19, three protrusions 42 are arranged at regular intervals in the circumferential direction θ, and three recesses 44 are arranged at regular intervals in the circumferential direction θ. Three protrusions 42 have a point symmetry about a central axis AX.

Each of three protrusions 42 do not overlap with a line LX. When the other base plate 20 that is rotated at 180 degrees about the line LX overlaps with one base plate 20, three protrusions 42 of one base plate 20 overlap with three recesses 44 of the other base plate 20, and three protrusions 42 of the other base plate 20 overlap with three recesses 44 of one base plate 20. Three protrusions 42 of one base plate 20 do not overlap with three protrusions 42 of the other base plate 20.

The first length L1 of three protrusions 42 is approximately equal to the second length L2 of three recesses 44. In the six embodiment, an angle in the circumferential direction θ of a range in which one protrusion 42 is formed is approximately equal to 60 degrees.

In the configuration of the base plate 20 of the sixth embodiment, too, the same advantages as those of each of the above-described embodiments can be obtained. In the base plate 20 of the sixth embodiment, outer surfaces 53 of the three protrusions 42 are provided at equal intervals with respect to an inner circumferential surface 84 of an attachment hole 83, in the circumferential direction θ.

Thus, when a ball is passed through the attachment hole 83 along the thickness direction Z, the inner circumferential surface 84 can be pressed at regular intervals from the outer surface 53 in the circumferential direction θ. As a result, the outer surface 53 can be brought into close contact with the inner circumferential surface 84 at regular intervals in the circumferential direction θ, and the plurality of protrusions 42 can be connected to the attachment hole 83 in a well-balanced manner.

In the sixth embodiment, the first length L1 of the three protrusions 42 may be smaller than the second length L2 of the three recesses 44. In this case, when the other base plate 20 that is rotated at 180 degrees about the line LX overlaps with one base plate 20, gaps are formed between the protrusions 42 of one base plate 20 and the protrusions 42 of the other base plate 20 in the circumferential direction θ, respectively.

Seventh Embodiment

Figure 20:
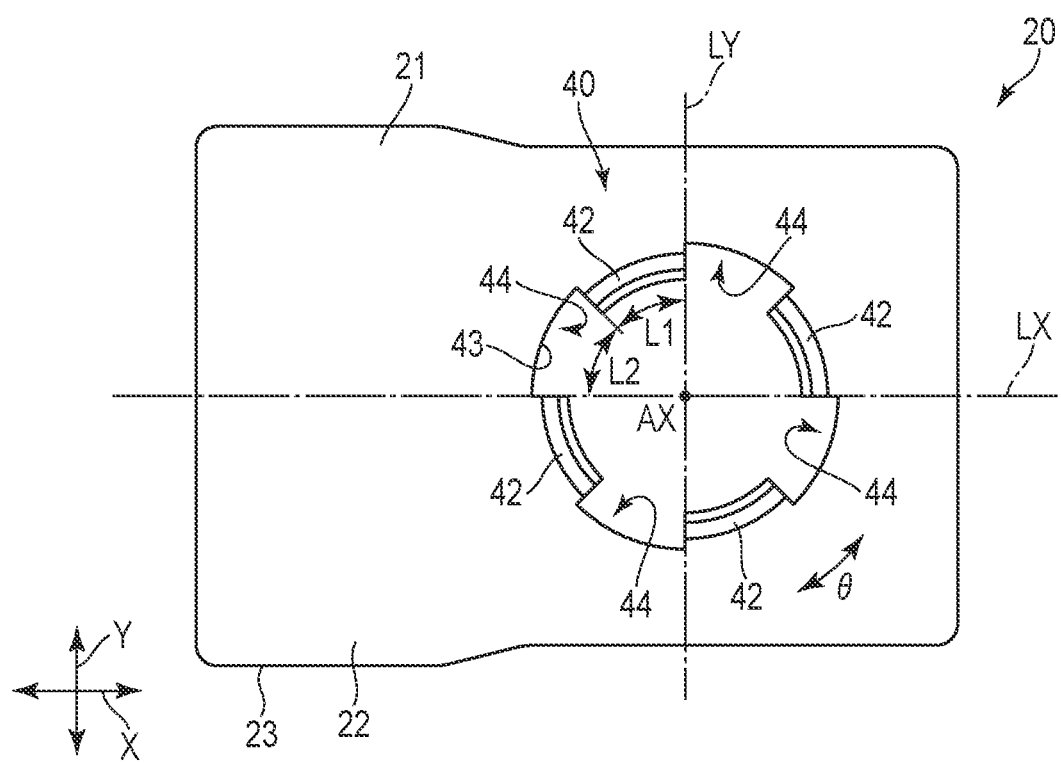
FIG. 20 is a schematic plan view showing a base plate according to a seventh embodiment.

FIG. 20 is a schematic plan view showing a base plate 20 according to a seventh embodiment. The base plate 20 of the seventh embodiment is different from that of each of the above-described embodiments in comprising four protrusions 42.

As shown in FIG. 20, a connection portion 40 of the base plate 20 includes four protrusions 42 and four recesses 44. In the example shown in FIG. 20, four protrusions 42 are arranged at regular intervals in the circumferential direction θ, and four recesses 44 are arranged at regular intervals in the circumferential direction θ. Four protrusions 42 have a point symmetry about a central axis AX.

Each of four protrusions 42 do not overlap with a line LX or a line LY. When the other base plate 20 that is rotated at 180 degrees about the line LX overlaps with one base plate 20, four protrusions 42 of one base plate 20 overlap with four recesses 44 of the other base plate 20, and four protrusions 42 of the other base plate 20 overlap with four recesses 44 of one base plate 20. Four protrusions 42 of one base plate 20 do not overlap with four protrusions 42 of the other base late 20.

The first length L1 of four protrusions 42 is approximately equal to the second length L2 of four recesses 44. In the seventh embodiment, an angle in the circumferential direction θ of a range in which one protrusion 42 is formed is approximately equal to 45 degrees.

In the configuration of the base plate 20 of the seventh embodiment, too, the same advantages as those of each of the above-described embodiments can be obtained. The base plate 20 of the seventh embodiment includes more protrusions 42 than the base plate 20 of the sixth embodiment described with reference to FIG. 19. Thus, the plurality of protrusions 42 can be connected to the attachment hole 83 in a more balanced manner as compared with the base plate 20 of the sixth embodiment described with reference to FIG. 19.

In the seventh embodiment, the first length L1 of the four protrusions 42 may be smaller than the second length L2 of the four recesses 44. In this case, when the other base plate 20 that is rotated at 180 degrees about the line LX overlaps with one base plate 20, gaps are formed between the protrusions 42 of one base plate 20 and the protrusions 42 of the other base plate 20 in the circumferential direction θ, respectively.

In implementing the inventions disclosed in the above embodiments, the specific configuration of each element constituting the suspension for the disk drive, including the specific configuration such as shapes of the base plate, the load beam, and the flexure, can be modified in various manners.

The first lengths L1 of the plurality of protrusions 42 may be different from each other. In this case, angles in the circumferential direction θ of the range in which each of the protrusions 42 is formed are different in the plurality of protrusions 42. For example, when the plurality of protrusions 42 are constituted by two protrusions 42, the angle in the circumferential direction θ of the range in which one of the protrusions 42 is formed may be approximately equal to 100 degrees, and the angle in the circumferential direction θ of the range an which the other protrusions 42 are formed may be smaller than 80 degrees.

When the other base plate 20 that is rotated at 180 degrees about the line LX overlaps with one base plate 20, the plurality protrusions 42 of one base plate 20 may be shaped so as not to overlap with the plurality of recesses 44 of the other base plate 20. For example, the plurality of protrusions 42 of the base plate 20 may have a line symmetry about the line LX. The number of the plurality of protrusions 42 may be five or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A base plate of a disk drive suspension connected to an arm provided in a disk drive, the base plate comprising:
   a plate body formed of a metal material; and
   a connection portion provided at the plate body, the connection portion including (i) a through hole passing through the plate body in a thickness direction of the plate body, (ii) a plurality of protrusions provided along an edge of the through hole in a circumferential direction about a central axis of the through hole, inserted into an attachment hole provided in the arm, and having been plastically deformed in a radial direction extending from the central axis, and (iii) an inner circumferential surface formed by the plurality of protrusions and the through hole, the inner circumferential surface including a plurality of recesses formed between the plurality of protrusions,
   wherein:
   the plurality of protrusions are fixed to the arm by plastic deformation of at least portions of the plurality of protrusions which are inserted into and in contact with an inner circumferential surface of the attachment hole,
   the plurality of protrusions have a first length in the circumferential direction, and
   the plurality of recesses have a second length greater than the first length in the circumferential direction.

2. The base plate of claim 1, wherein:
   the plate body has a first surface opposed to the arm and a second surface on a side opposite to the first surface,
   each of the plurality of protrusions includes (i) a proximal portion connected to the plate body between the first surface and the second surface, (ii) an extending portion including an end located on a side opposite to the proximal portion in the thickness direction, and (iii) a pressing portion located between the proximal portion and the end,
   a width of the pressing portion in the radial direction is greater than a width of the proximal portion in the radial direction, and
   the pressing portion overlaps the arm in the radial direction when connected to the arm.

3. A disk drive suspension comprising:
   the base plate of claim 1;
   a load beam connected to the base plate; and
   a flexure arranged along the load beam.

4. The disk drive suspension of claim 3, wherein the plurality of protrusions do not overlap with a line intersecting the central axis and parallel to an extension direction of the load beam.

5. The base plate of claim 1, wherein a distance from the central axis to the plurality of recesses in the radial direction is greater than a distance from the central axis to the plurality of protrusions in the radial direction.

6. The base plate of claim 1, wherein:
   the plate body has a first surface opposed to the arm and a second surface on a side opposite to the first surface, and
   each of the plurality of protrusions includes a proximal portion connected to the plate body between the first surface and the second surface and an extending portion including an end located on a side opposite to the proximal portion in the thickness direction.

7. The base plate of claim 6, wherein the extending portion has a height so as not to protrude from an attachment surface of the arm when connected to the arm.

8. The base plate of claim 6, wherein the inner circumferential surface of the connection portion has an inclined surface defined in the plurality of protrusions and inclined so as to approach the central axis along the thickness direction.

9. A disk drive comprising:
   an arm formed of a metal material and having a first attachment surface, a second attachment surface on a side opposite to the first attachment surface, and an attachment hole passing through the first attachment surface and the second attachment surface;
   a first disk drive suspension connected to the arm from a side of the first attachment surface, the first disk drive suspension comprising a first base plate, a first load beam connected to the first base plate, and a first flexure arranged along the first load beam; and
   a second disk drive suspension connected to the arm from a side of the second attachment surface, the second disk drive suspension comprising a second base plate, a second load beam connected to the second base plate, and a second flexure arranged along the second load beam,
   wherein:
   each of the first base plate and the second base plate comprises a plate body formed of a metal material and a connection portion provided at the plate body, the connection portion including (i) a through hole passing through the plate body in a thickness direction of the plate body, (ii) a plurality of protrusions provided along an edge of the through hole in a circumferential direction about a central axis of the through hole, the plurality of protrusions having been plastically deformed in a radial direction extending from the central axis, and (iii) an inner circumferential surface formed by the plurality of protrusions and the through hole, the plurality of protrusions of the first base plate and the plurality of protrusions of the second base plate are inserted into the attachment hole, and are fixed to the arm by plastic deformation of at least portions of the plurality of protrusions of the first base plate and the plurality of protrusions of the second base plate which are inserted into and in contact with an inner circumferential surface of the attachment hole, and the plurality of protrusions of the first base plate overlap with a plurality of recesses formed between the plurality of protrusions of the second base plate.

10. The disk drive of claim 9, wherein a height of the plurality of protrusions of each of the first base plate and the second base plate is greater than a thickness of the arm.

11. The disk drive of claim 9, wherein a height of the plurality of protrusions of each of the first base plate and the second base plate is substantially equal to a thickness of the arm.

* * * * *